(12) United States Patent
Thornton et al.

(10) Patent No.: US 8,917,051 B2
(45) Date of Patent: Dec. 23, 2014

(54) INTEGRATED FUEL PROCESSOR AND FUEL CELL SYSTEM CONTROL METHOD

(75) Inventors: Douglas A. Thornton, Columbus, OH (US); Vincent Contini, Powell, OH (US); Todd A. McCandlish, Columbus, OH (US)

(73) Assignee: Battelle Memorial Institute, Columbus, OH (US)

( * ) Notice: Subject to any disclaimer, the term of this patent is extended or adjusted under 35 U.S.C. 154(b) by 608 days.

(21) Appl. No.: 13/320,617

(22) PCT Filed: May 21, 2010

(86) PCT No.: PCT/US2010/035749
§ 371 (c)(1),
(2), (4) Date: Dec. 20, 2011

(87) PCT Pub. No.: WO2010/135632
PCT Pub. Date: Nov. 25, 2010

(65) Prior Publication Data
US 2012/0062166 A1 Mar. 15, 2012

Related U.S. Application Data

(60) Provisional application No. 61/180,606, filed on May 22, 2009.

(51) Int. Cl.
| H01M 10/44 | (2006.01) |
|---|---|
| H01M 8/04 | (2006.01) |
| C01B 3/34 | (2006.01) |
| H01M 8/06 | (2006.01) |
| H01M 16/00 | (2006.01) |

(52) U.S. Cl.
CPC ............ *H01M 8/04992* (2013.01); *C01B 3/34* (2013.01); *H01M 8/04373* (2013.01); *H01M 8/04388* (2013.01); *H01M 8/04567* (2013.01); *H01M 8/04589* (2013.01); *H01M 8/04597* (2013.01); *H01M 8/04738* (2013.01); *H01M 8/04753* (2013.01); *H01M 8/04776* (2013.01); *H01M 8/0687* (2013.01); *H01M 16/006* (2013.01); *B01D 2256/16* (2013.01); *C01B 2203/0205* (2013.01); *C01B 2203/0405* (2013.01); *C01B 2203/047* (2013.01); *C01B 2203/066* (2013.01); *C01B 2203/0827* (2013.01); *C01B 2203/1614* (2013.01); *C01B 2203/1628* (2013.01); *C01B 2203/1685* (2013.01); *C01B 2203/1695* (2013.01); *H01M 2250/20* (2013.01); *Y02E 60/50* (2013.01); *Y02T 90/32* (2013.01)
USPC ............................ 320/101; 320/138; 320/139

(58) Field of Classification Search
CPC .................................................... H02J 7/35
USPC ............................................................ 320/101
See application file for complete search history.

(56) References Cited

U.S. PATENT DOCUMENTS

| 6,294,149 B1 | 9/2001 | Autenrieth et al. |
| 6,368,735 B1 | 4/2002 | Lomax et al. |

(Continued)

FOREIGN PATENT DOCUMENTS

| EP | 0 957 063 A1 | 11/1999 |
| EP | 1 995 212 A1 | 11/2008 |
| WO | 99/65097 A1 | 12/1999 |

*Primary Examiner* — Yalkew Fantu
(74) *Attorney, Agent, or Firm* — MacMillan, Sobanski & Todd, LLC

(57) ABSTRACT

The present invention provides a novel method of controlling a mobile, integrated fuel processor and fuel cell system that utilizes an innovative combination of feedback and feed forward control loops maintain the reformer temperature and hydrogen permeate pressure in the system with the operating parameters of the fuel reformer being adjusted to achieve rapid and more reliable load following when transient conditions occur.

18 Claims, 2 Drawing Sheets

(56) References Cited

U.S. PATENT DOCUMENTS

| | | |
|---|---|---|
| 6,455,180 B1 * | 9/2002 | Mowery et al. .............. 429/432 |
| 2001/0049038 A1 * | 12/2001 | Dickman et al. ............... 429/19 |
| 2005/0118472 A1 * | 6/2005 | Yang et al. ..................... 429/23 |
| 2006/0210853 A1 * | 9/2006 | Fukuda .......................... 429/23 |
| 2008/0090107 A1 * | 4/2008 | Scartozzi et al. ................ 429/7 |
| 2010/0266875 A1 * | 10/2010 | Somogye et al. ................ 429/7 |

* cited by examiner

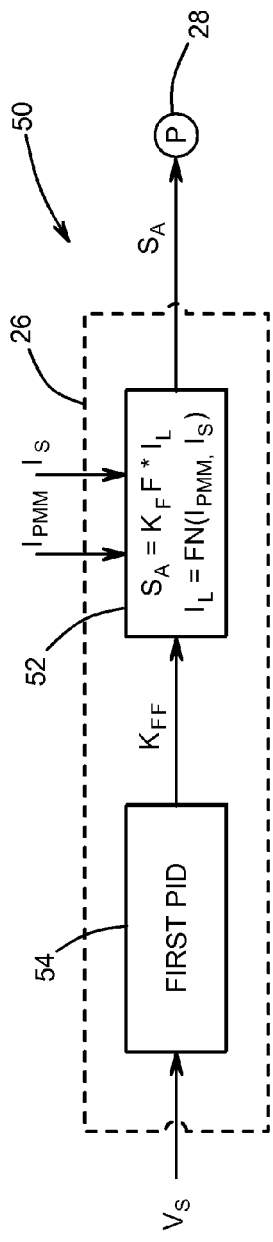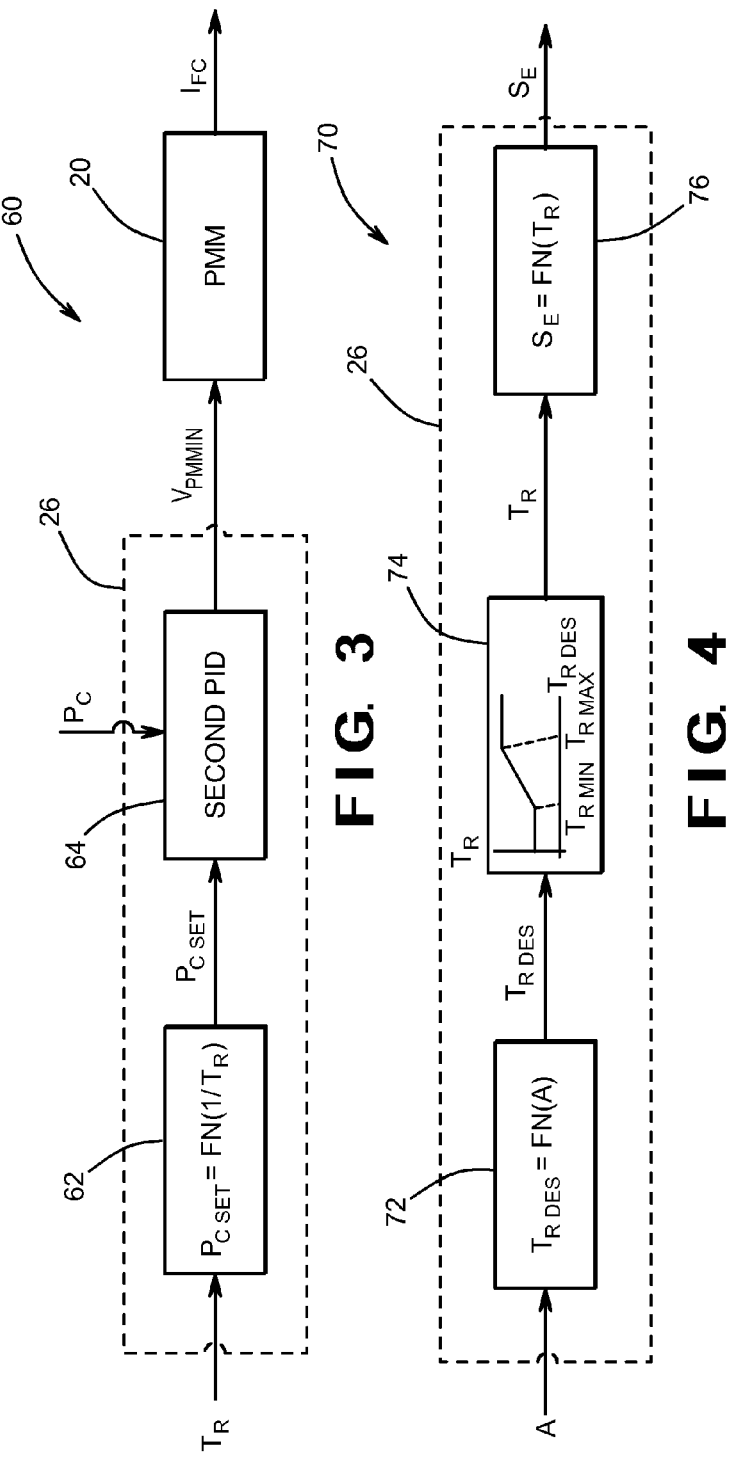

INTEGRATED FUEL PROCESSOR AND FUEL CELL SYSTEM CONTROL METHOD

BACKGROUND OF THE INVENTION

This invention relates in general to fuel cell systems and in particular to an apparatus and method for controlling fuel cell systems.

The control of closely coupled fuel processor & fuel cell systems presents numerous challenges. The supply of hydrogen must be balanced with the load demand to provide adequate electrical power without returning too much or too little heating capacity to the fuel processor through the form of hydrogen unconsumed by the fuel cell. When the system is to operate in a grid-attached manner, the transients of the load can be shared and their effects minimized by the grid. The sharing of load allows for longer ramp times and slower responding controls.

By contrast, mobile generators must react quickly since these generators cannot rely on the rest of the grid to share the transient, and the load changes can be a significant percentage of the rated power. The process described in accordance with the present invention is a novel method of controlling a mobile, integrated fuel processor and fuel cell system. Such mobile generators are often of low net power with a typical capacity in the range of 1 to 50 KW.

SUMMARY OF THE INVENTION

This invention relates to an apparatus and method for controlling fuel cell systems.

In a typical integrated fuel cell system, a fuel processor breaks down a fuel source into hydrogen, which is then passed to a fuel cell that combines the hydrogen with oxygen generating electric current. The electric current can then be applied to a load. Typically, fuel cell output is based directly upon the current demanded by the load.

In accordance with the present invention, an innovative combination of feedback and feed forward control loops are used to maintain the reformer temperature and hydrogen permeate pressure in the system so that the fuel reformer is the component whose operating parameters are adjusted to achieve more rapid and more reliable load following when transient conditions occur.

The present invention contemplates an integrated fuel processor and fuel cell system that includes a fuel processor connected to a controllable fuel supply and operatively configured to receive fuel from the controllable fuel supply and convert a portion of the fuel into permeate. The system also includes a fuel cell operatively connected to the membrane separator to receive the permeate and a power management module connected to an output of the fuel cell. The invention also contemplates an energy storage device and an electrical load connected to outputs of the power management module. Finally, the system further includes a fuel processor electronic control unit that is operative to control the rate at which fuel is supplied to the fuel processor as a function of a temperature within the fuel processor and a pressure of the permeate.

The present invention also contemplates a method of controlling an integrated fuel processor and fuel cell system that includes the steps of providing a variable supply of permeate as fuel for the fuel cell, adjusting the permeate pressure at the fuel cell as a function of the output current of the fuel cell; and controlling the permeate pressure at the fuel cell as a function of a temperature of a portion of the fuel processor.

Various objects and advantages of this invention will become apparent to those skilled in the art from the following detailed description of the preferred embodiment, when read in light of the accompanying drawings.

BRIEF DESCRIPTION OF THE DRAWINGS

FIG. 2 is a flow chart of a primary fuel process and fuel cell control system algorithm for the system shown in FIG. 1 that is in accordance with the present invention.

FIG. 3 is a flow chart for a secondary algorithm that is also used to control the system shown in FIG. 1.

FIG. 4 is a flow chart for another secondary algorithm that is also used to control the system shown in FIG. 1.

DETAILED DESCRIPTION OF THE PREFERRED EMBODIMENT

Figure 1:
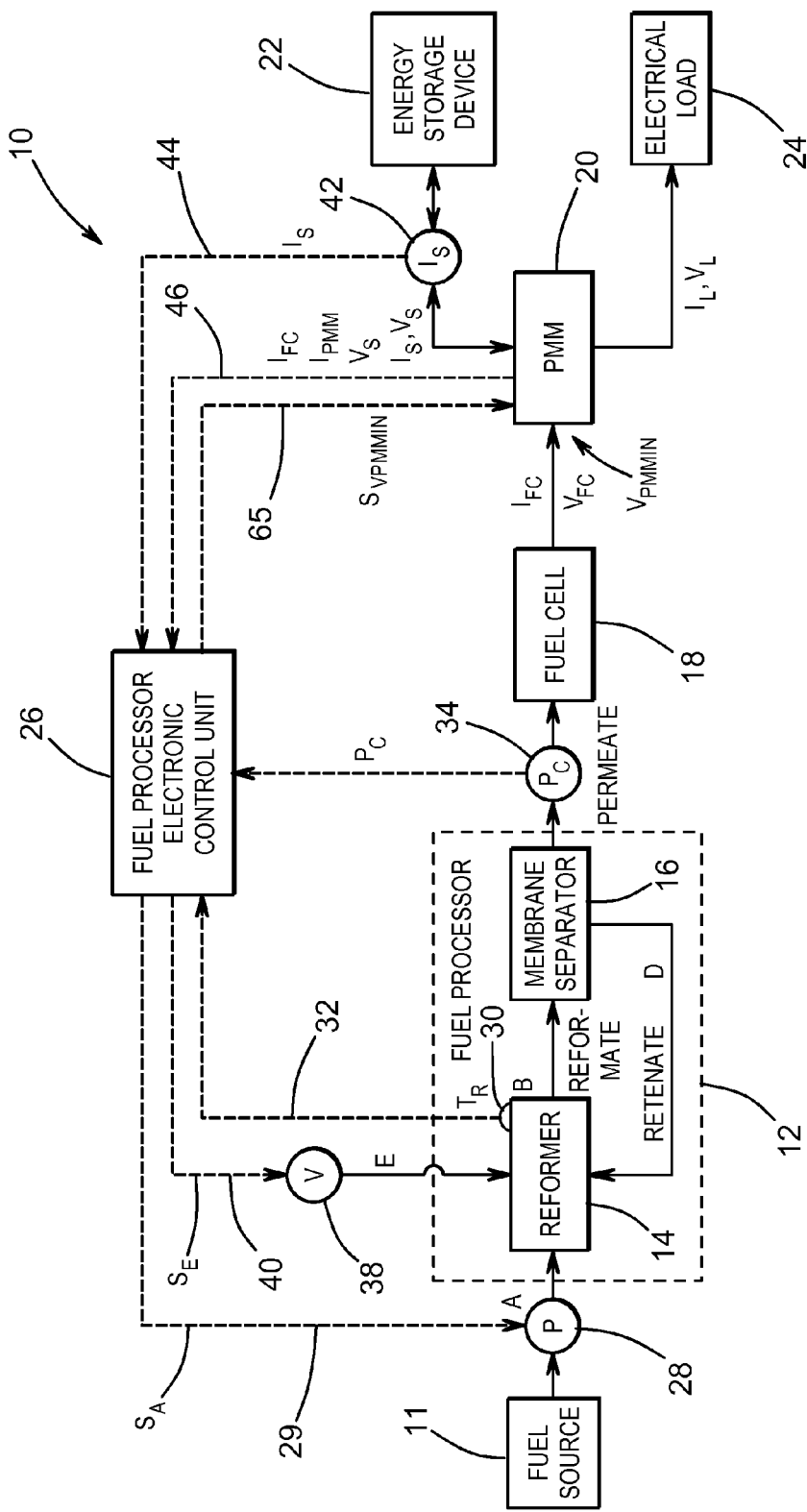
FIG. 1 is a block diagram of a simplified integrated fuel processor and fuel cell system.

Referring now to FIG. 1, there is shown an integrated fuel cell system 10 in accordance with the present invention. In FIG. 1, the flows of fuel and currents are shown by solid arrows while sensor signals and control signals are shown with dashed arrows. The integrated fuel cell system 10 includes a fuel source 11 that is connected to a fuel processor 12. The fuel processor 12 is operative to break down the fuel supplied by the fuel source 11 into hydrogen. The fuel processor 12 is shown as consisting of two elements, a reformer 14 and a membrane separator 16. The output of the membrane separator 16 is connected to a fuel cell 18.

The reformer 14 is a device that breaks down a hydrocarbon fuel input A into its elements through an endothermic reaction, which is driven by the combustion of the excess gases created in that process. The membrane separator 16 takes the broken down hydrocarbon gases known as reformate B and isolates the hydrogen, referred to as the permeate C. The hydrogen, or permeate C, is passed to the fuel cell 18 while the rest of the gases, referred to as retentate D, are returned to the reformer 14 to be combusted with a controlled variable input airflow E. The hydrogen C then passes to the fuel cell 18 that combines the hydrogen with oxygen, generating a fuel cell electric current $I_{FC}$ and a fuel cell voltage $V_{FC}$.

The fuel cell output power at P, as determined by the fuel cell current $I_{FC}$ and/or the fuel cell voltage $V_{FC}$, is controlled by a Power Management Module (PMM) 20. The PMM 20 functions as a voltage converter to convert the fuel cell voltage to the appropriate bus voltage while regulating the current $I_{LC}$ being drawn from the fuel cell 18. The fuel cell 18 is operated in what is referred to as dead ended mode. In this method of operation, only the hydrogen C being consumed is allowed to flow into the fuel cell 18, and there is no path for the hydrogen C to exit without being consumed. The output of the PMM 20 is connected to an energy storage mechanism 22, such as, for example, rechargeable batteries, capacitors, and other conventional energy storage devices, and an electrical load 24. The energy storage device 22 has two functions, with the first being to provide startup energy to bootstrap the system into operation, and the second being to buffer transients of load demand by providing additional current to supplement the current supplied by the fuel cell 18 when demand exceeds fuel cell output. Hence, a double headed arrow signifying reversible flow of the energy storage device current $I_S$ is shown in FIG. 1 connecting the PPM 20 to the energy storage device 22. The energy storage device 22 also receives excess current when load demand falls below fuel cell output. This allows recharging of the energy storage device 22. As also shown in FIG. 1, the current supplied from the PPM 20 to the load 24 is labeled $I_L$.

As shown in FIG. 1, the system 10 includes a Fuel Processor Electronic Control Unit (FPECU) 26. As will be explained below, the FPECU 26 is operable to monitor operating conditions via received sensor signals from within the system 10 and sends control signals to controllable elements to provide the needed system control. Accordingly, the FPECU 26 includes hardware and software, along with memory to store and implement system operating algorithms. Control may be implemented with either a microprocessor or Application Specific Integrated Circuit (not shown) that is disposed within the FPECU 26. It will be appreciated that the system may also be controlled with other conventional devices, such as, for example, a dedicated personal computer.

The system 10 also includes a variable speed pump 28 connected between the fuel source 11 and fuel processor 12. The pump speed can be varied by the FPECU 26 with control signals $S_A$ sent along the line labeled 29 to control the amount of fuel A supplied to the fuel processor 12. Alternately, the fuel source 11 may be pressurized and vents and/or valves (not shown) utilized to control the flow of fuel into the fuel processor 12. Additionally, a combination of a variable speed pump and vents and/or valves may be substituted for the pump 28 shown in FIG. 1. Also shown in FIG. 1 is a temperature sensor 30, such as, for example, a thermocouple, that is mounted on the reformer 14 and operative to send a temperature signal $T_R$ via the line labeled 32 to the FPECU 26. A pressure sensor 34 is located on the output of the fuel processor 12 and is operative to send a pressure signal $P_C$ over the line labeled 36 to the FPECU 26. The system 10 further includes an air flow controller 38 that is operative to vary the air flow E into the reformer 14 that supports the combustion of the fuel input A. The controller 38 may include a variable speed fan and/or variable vents and receives control signals $S_E$ from the PMM 20 over the line labeled 40. Additionally, the FPECU 26 receives an energy storage device current signal $I_S$ from a current sensor 42 over a line labeled 44. Finally, the PMM 20 monitors the current $I_{FC}$ generated by the fuel cell 20 the voltage of the energy storage device $V_S$ and the total output current $I_{PMM}$ supplied by the PMM and sends signals representing those quantities to the FPECU 26 over the line labeled 46.

The present invention contemplates an innovative combination of feedback and feed forward control loops that are used to maintain the reformer temperature and hydrogen permeate pressure in the system within desired parameters so that the fuel reformer 14 is the component whose operating parameters are adjusted to achieve more rapid and more reliable load following when transient conditions occur. The ranges of the reformer temperature and hydrogen permeate pressure depend upon the type and manufacturer of the fuel cell 18, and fuel processor 12. They may also vary depending on the size of the system 10 and system design and manufacture. By way of example and not limitation, in one system, the reformer temperatures are maintained in a range of from approximately 900 to 1000 degrees centigrade, and the permeate pressure is maintained in a range from 5 to 30 psi.

The feedback occurs in a way that may be described as a cascade control. Rather than following the load demand, again referring to FIG. 1, the present invention contemplates measurement of total output current $I_{PMM}$ from the PMM 20 and the current $I_S$ out of the energy storage device 22. The measured PMM output current $I_{PMM}$ and the energy storage device current $I_S$ are then used to calculate the current $I_L$ being drawn by the load 24. The current being controlled is the fuel cell current $I_{FC}$ that comes out of the fuel cell 18. Measurement of the PMM output current $I_{PMM}$ output is part of a feedback loop that maintains a pressure $P_C$ of the hydrogen permeate C at the inlet to the fuel cell 18 that is necessary to balance the combustion temperature $T_R$ of the reformer 14. Without more, a fuel reformer in steady state will continue to supply hydrogen to a fuel cell, and build hydrogen pressure at the fuel cell inlet that causes excess heat production in the reformer 14. To complete the feedback loop and maintain the permeate pressure at the desired level, excess permeate within the membrane separator 16 is diverted from the inlet side of the fuel cell and returned to the fuel reformer 14 as shown generally and identified as retentate D in FIG. 1.

In turn, the temperature of combustion gases $T_R$ within the reformer 14 is maintained by controlling the hydrogen permeate pressure $P_C$ that is desired at the inlet side of the fuel cell 18. Because the fuel reformer 14 can be damaged by high temperatures or operate inefficiently at low temperatures, the reformer operates in a preferred temperature range to supply hydrogen to the fuel cell. Thus, the reformer combustion temperature $T_R$ is maintained so that the sum of the volume of retentate D plus the volume of new fuel input A maintains a proper reformer combustion temperature $T_R$ and the reformer 14 produces the desired permeate pressure $P_C$.

In order for the fuel cell system to provide for load following to match the electrical power drawn by an unpredictable electrical load, the fuel flow A into the fuel processor 12 can be varied by varying the speed of the fuel pump 28 that is connected between the fuel source 11 and the fuel processor 12. The speed of the pump 28 by which the fuel flow A is controlled is set by an estimate of the load current $I_L$. The method for setting the fuel flow A is achieved through multiplying the estimated load current by a feed forward gain $K_{FF}$, and illustrated by the flow chart shown in FIG. 2. Feed forward gain $K_{FF}$ is defined more completely below. The feed forward gain $K_{FF}$ is then adjusted by the voltage of the energy storage device 22, so that the needs for both the electrical load current $I_L$ and energy storage maintenance can be met. Alternately, the fuel source 11 may be maintained at a constant pressure and valves (not shown) utilized to control the fuel flow A. Additionally, the fuel flow A may be controlled by a combination of a variable speed pump and valves (not shown).

Generally, the ability of any electrical power generator to track changes in a load and adjust accordingly so that the correct amount of output power is available to meet demand is called load following. As mentioned above, if the fuel input A to a fuel cell system exceeds the amount needed for power output during load following, excess heat will be generated, causing potential system failure. If there is a deficiency of fuel input A relative to the need for the power output, power will be drawn from the energy storage device 22, which will eventually be depleted so that the load cannot be serviced by the fuel cell system 10. Therefore, a fuel cell control system needs to be robust in operating over different loads and states of charge. That is, the control system needs to be able to respond quickly to establish equilibrium when there is a transient condition. This ability to respond also needs to produce desired performance over the lifetime of the fuel cell system 10. As the fuel processor 12 and fuel cell 18 performances degrade over time, the control system must be able to maintain safe operation, while automatically adjusting without user intervention to these changes.

The control system in accordance with the present invention includes both process and control variables. The process variables are the sensor measurements, or inputs to the control system, that are desired to be maintained at a value or range, while the control variables are outputs whose modification effects a change in a process variable.

The process variables utilized with the present invention are related to the control variables by the following:

1. Electrical load 24 and state of the energy storage medium 22, such as load current and voltage $I_L$ and/or $V_L$ and energy storage medium current and voltage $I_S$ and/or $V_S$, are process variables that are used to adjust the delivery rate of fuel input A which is a control variable;

2. Fuel Cell current $I_{FC}$, which is a control variable measured at the output of the fuel cell 18, is controlled to maintain a level of returned hydrogen retentate D, which is a process variable;

3. Reformer combustion temperature $T_R$, which is a process variable, is adjusted by setting the level of returned hydrogen retentate D, which is a control variable, to be maintained;

4. Permeate pressure $P_C$, which is a process variable, is used to estimate the level of returned hydrogen retentate D and adjusted by varying the fuel cell current $I_{FC}$.

5. Input air flow into the reformer E which is a process variable and is adjusted as a function of the fuel flow rate and constrained by the temperature within the reformer.

The rate of fuel input A is controlled by an estimate of the electrical load present and the state of charge of the energy storage device 22. With reference to FIG. 2, a flow chart for a control algorithm 50 for the system fuel supply rate A that is in accordance with the present invention is shown. The control algorithm 50 uses a feed forward control system in which the feed forward gain $K_{FF}$ is multiplied by the load current $I_L$, with the load current taken as the difference between the total output current $I_{PMM}$ from the PMM and the energy storage device current $I_S$ to arrive at a fuel flow rate as shown in Equation 1.

$$\text{Fuel Flow}=S_A=K_{FF}*I_L=K_{FF}*(I_{PMM}-I_S), \quad \text{Equation 1}$$

The determination of the fuel flow, and thereby the fuel flow control signal $S_A$, is carried out in the block labeled 52 in FIG. 2. The electrical current $I_{PMM}$ from the PMM 20 is measured as positive for current leaving the PMM 20. The current $I_S$ for the energy storage device 22 is measured as positive when current is going into, or charging, the energy storage device 22. Alternately, a direct measure of the load current $I_L$ may be used in Equation 1 with different placement of the current sensor 42. As a safety measure, the rate of change of the fuel flow determined by Equation 1 is limited to a predefined value. The positive and negative going rates of change are capped at a unique value that reduces sensitivity to measurement noise and surge currents drawn by inductive loads such as refrigerators and motors. The safety rate is defined in units of mass flow rate per second (grams/second) or volumetric flow rate per second (milliliters/second). The positive and negative going rates are capped differently because the system can react, and needs to react, to decreases in loads faster than it does to increases. During a load decrease, excess power is temporarily consumed by the energy storage device 22. Due to the finite storage capacity, this excess power cannot be held for a long duration, and the system 10 must be ramped down quickly. The generation of the fuel flow signal $S_A$ is carried out in the box labeled 52 in FIG. 2.

The feed forward gain $K_{FF}$ is a function of the state of charge of the energy storage device 22, as shown below by Equation 2. An estimate of the state of charge of the energy storage device 22 depends upon the specific type of device that is used. For example, with lead acid batteries, the state of charge is determined observing the voltage of the batteries $V_S$.

The voltage $V_S$ is proportional to the state of charge when the net battery current is zero. The feed forward gain $K_{FF}$ is adjusted via a first Proportional-Integral-Derivate (PID) control system algorithm, which is shown in FIG. 2 as the box labeled 54 and which raises or lowers the feed forward gain based upon the state of charge. Equation 2, below, shows the basics of this control method.

$$\text{Error}_{SOC}=V_{Desired}-V_{Battery}$$

$$K_{FF}=K_p*\text{Error}_{SOC}+(1/T_i)\int\text{Error}_{SOC}+T_d*\Delta\text{Error}_{SOC}, \quad \text{Equation 2.}$$

where $\Delta\text{Error}_{SOC}=\text{Error}_{SOC}(t+\Delta t)-\text{Error}_{SOC}(t)$;

with t being a point in time and t+$\Delta t$ being a point in time offset from t by an increment of time;

and $V_{Desired}$ is the voltage required to maintain the proper state of charge on the batteries, $V_S$ is the measured voltage of the battery. The value for $V_{Desired}$ is s dependent upon the specific energy storage device being utilized. For example, if lead acid batteries are used for the energy storage device 22, $V_{Desired}$ is typically set at 26.3 volts for a battery pack commonly used on military vehicles. Other lead-acid batteries would have a different value. $K_p$ is referred to as the proportional gain, $T_i$ the integral gain, and $T_d$ the derivative gain. The determination of the feed forward gain $K_{FF}$ is carried out in the block labeled 54 in FIG. 2.

A state of charge algorithm to determine $\text{Error}_{SOC}$ utilizes Equation 2 and is included in the box labeled PID in FIG. 2. Battery life can be extended when the batteries are maintained in accordance with manufacturer recommendations. If more exotic battery chemistries are used such as lithium ion, the state of charge algorithm is critical to the long-term performance and reliability of the system 10. As such, the ability to use the control system to manage the state of charge is a major benefit of the proposed control approach. Other control algorithms that lack active and adaptable state of charge algorithm will be greatly hindered in implementation. It will be appreciated that the feed forward and PID controls used by the present invention also could be performed through other control methods such as state space and fuzzy logic when the system dynamics are better known and understood.

The fuel cell current $I_{FC}$ at the output of the fuel cell 18 is measured in amperes and is dynamically adjusted by the PMM 20 by varying the input voltage to the PMM. As the input voltage to the PMM 20 is changed, the fuel cell current $I_{FC}$ varies inversely with the changed voltage. The PMM input voltage is controlled by the FPECU 26 with a signal $S_{VPMMIN}$ sent over the line labeled 46 in FIG. 1. Given that all other variables are static, increasing the fuel cell current $I_{FC}$ will lower the percent hydrogen D returned to the fuel processor reformer 14, while decreasing the fuel cell current $I_{FC}$ will raise the percent returned hydrogen. Knowing at any time what percent returned hydrogen is present is difficult to measure directly, therefore a means of estimating this value is required. A novel method of estimating the percent hydrogen returned in the present invention utilizes the pressure of hydrogen permeate $P_C$ to estimate the percent returned hydrogen retentate D. Since the fuel cell 18 is operated in dead ended mode, excess hydrogen cannot flow through the fuel cell 18. When excess hydrogen C is present, it will cause the pressure to increase on the inlet to the fuel cell 18. Since the membrane separator 16 is being used, an increase in pressure on the permeate C side will cause less hydrogen to flow across the membrane separator 16 and more hydrogen to be returned as retentate D to the reformer 14. Thus, the fuel cell current $I_{FC}$ can be controlled to maintain a permeate pressure $P_C$, while the permeate pressure can be used to represent a percent returned hydrogen, thus a method of controlling the percent returned hydrogen retentate D is available.

The present invention utilizes a secondary PID control algorithm 60, as illustrated by the flow chart shown in FIG. 3, to adjust the fuel cell current $I_{FC}$ based upon the pressure of permeate $P_C$. As before, a different control architecture, such as for example, state space, could be used to control the fuel cell current. As before, the secondary control algorithm 60 is included within the FPECU 26. The sensed reformer temperature $T_R$ is input to the block labeled 62 and transformed into a permeate pressure set-point $P_{CSET}$ that is an inverse function of the reformer temperature $T_R$, as shown by the block labeled 62 in FIG. 3. The transformation may be a simple linear transformation that is implemented by multiplying the inverse of the reformer temperature by a constant or may involve a more complex non-linear function and/or a look-up table. The permeate pressure set-point $P_{CSET}$ is then supplied to a second PID control system algorithm, which is contained in the box labeled 64. The second PID algorithm also utilizes the actual permeate pressure $P_C$. The second PID control system algorithm produces a desired value for the PMM input voltage $V_{PMMIN}$ and uses the following equation 3:

$$\text{Error}_{POC} = P_C - P_{CSET}$$

$$V_{PMMIN} = K_{p2} * \text{Error}_{POC}(1/T_{i2})$$
$$\int \text{Error}_{POC} T_{d2} * \Delta \text{Error}_{POC}, \quad \text{Equation 3;}$$

where $\Delta \text{Error}_{POC} = \text{Error}_{POC}(t+\Delta t) - \text{Error}_{POC}(t)$;
with t being a point in time and t+Δt being a point in time offset from t by an increment of time; and $K_{p2}$ is referred to as the proportional gain, $T_{i2}$ the integral gain, and $T_{d2}$ the derivative gain. As shown in FIG. 3, the control signal $V_{PMMIN}$ is sent to the PMM 20 over a line labeled 65 in FIG. 1. The control signal $V_{PMMIN}$ varies the input setting of the PMM 20 to control the fuel cell current $I_{FC}$ which, in turn, drives a change in the permeate pressure The combustion temperature $T_R$ in the reformer 14 is a highly important value to control. The proper reformer combustion temperature $T_R$ is needed to ensure that the delivered fuel input A is properly broken down and that excess gases such as methane and carbon monoxide are consumed so that clean and safe operation of the system 10 is obtained. The reformer combustion temperature $T_R$ in the fuel reforming process is affected by the percent hydrogen retentate D returned to the combustor, or reformer 14. Due to system nonlinearities with power level, ambient temperature and other factors, a constant percentage of returned hydrogen retentate D cannot be assumed adequate for fuel cell system 10 operation. If the combustion temperature $T_R$ is too hot the percent returned hydrogen is reduced and vice versa. Therefore, the percentage of returned hydrogen retentate D is adjusted in inverse proportion to the combustion temperature $T_R$, by setting the permeate set-point $P_{SET}$ in the block labeled 62 in FIG. 3. As explained above, the permeate set-pint $P_{SET}$ directly effects the permeate pressure, and thereby the percentage of returned retentate D.

The combustion process also requires an airflow E into the reformer 14 from an external source to be present. The amount of airflow greatly effects system efficiency. If there is too much airflow, then heat is wasted. If there is too little airflow, then the proper reaction and the reformer temperature $T_R$ cannot be maintained. Therefore, the present invention contemplates utilizing another secondary algorithm 70 for determining the rate of combustion air E. The air flow rate algorithm 70, which again is included in the FPECU 26, is illustrated by the flow chart shown in FIG. 4. In the block labeled 72, a desired reformer temperature $T_{RDES}$ is found as a function of the current fuel flow A, which is determined by the algorithm shown in FIG. 2. Reducing airflow E increases the reformer temperature $T_R$ and vice versa. The present control method is robust with respect to the airflow, allowing the airflow to be independently adjusted to obtain optimum efficiency without negatively impacting the rest of the system 10. The airflow can be lowered to a minimum value of the reformer temperature $T_R$ is reached, while the combustion temperature is held by the presented control system. Accordingly, the flow chart shown in FIG. 4 includes a reformer temperature limiter, which is included in the block labeled 74. As shown in FIG. 4, the block 74 defines a functional relationship between the desired reformer temperature $T_{RDES}$ determined in block 72 and the reformer temperature $T_R$, with the range of the reformer temperature limited by maximum and minimum set-points $T_{RMAX}$ and $T_{RMIN}$, respectively. The reformer temperature set-points $T_{RMAX}$ and $T_{RMIN}$ are adjustable and may be set for the specific components included in the system 10. The airflow control signal $S_A$, is then determined as a function of the reformer temperature $T_R$ in the block labeled 76. The relationship between the reformer temperature $T_R$ and the airflow control signal $S_A$ may be either a linear one or a non-linear one.

The response times of each control algorithm within the system 10 are vital to the stability of system operation. The primary algorithm is the one that controls the fuel cell current loop, which is the algorithm shown in the block labeled 64 FIG. 3, and, therefore, must be tuned so that its response is the fastest. This is naturally the case because the measurement of the process variable, hydrogen permeate pressure $P_C$, and control of the output variable, fuel cell current $I_{FC}$, can both occur very fast. The control of reformer temperature $T_R$ by adjusting permeate pressure $P_C$, as shown in block 62 of FIG. 3, needs to be tuned to respond slower than the fuel cell current loop to maintain stability, although the process itself tends to be slower to respond. Flow control of the fuel input A as shown in block 52 in FIG. 2 is also dependent upon the ramp rate of the fuel pump, but can be ramped quickly and still maintain stability due to the system maintaining a constant permeate pressure and thus a relatively constant percent returned hydrogen retentate. The disassociation of the fuel flow A with system state allows the system to respond quickly, providing load following capability. The adjustment of the feed forward gain $K_{FF}$, as shown in the block labeled 54 in FIG. 2, is tuned to respond slowly to allow transients to stabilize when new operating points are reached.

The present process control architecture is novel in that it provides a good performance and robustness while streamlining the implementation. Other control architectures found require a good knowledge of the system operation and use complicated control schemes that are less robust with respect to manufacturing differences and system characteristic changes over time. The lack of robustness is from the definition of operating states a priori, e.g. the fuel flow rate and fuel cell power are set based upon the load demand and not allowed to deviate from the predetermined set point. An accurate model is needed to generate these operating states. The model creation itself is time consuming and subject to errors.

The present process allows the entire fuel cell system 10 to reach a steady state value through feedback even if parameters change, such as fuel quality, ambient temperature, manufacturing variability, and system component "health". Feedback control permits the system to deal with process variations and non-linearity. Other methods do not use feedback because load following requirements dictate a fast response, which is difficult to obtain using feedback when the process being controlled is slow relative to the load following transients. Using an adjustable feed forward control, feedback is incorporated while allowing for fast load following response due to the disassociation of fuel flow rate with system temperature and pressure.

Another feature is that this control method uses very few sensors. A single thermocouple and a single pressure sensor are required along with current and voltage sensors already available on the PMM 20. Reducing the number of sensors increases reliability and decreases cost of the system 10.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An integrated fuel processor and fuel cell system comprising:
   a controllable fuel supply;
   a fuel processor connected to said controllable fuel supply and operatively configured to receive fuel from said controllable fuel supply and convert a portion of said fuel into permeate;
   a fuel cell connected to said fuel processor and operatively configured to receive permeate from said fuel processor;
   a power management module connected to an output of said fuel cell;
   an energy storage device connected to an output of said power management module;
   an electrical load connected to another output of said power management module; and
   a fuel processor electronic control unit, said electronic control unit operatively configured to control the rate at which fuel is supplied to said fuel processor as a function of a temperature within said fuel processor and a pressure of said permeate.

2. The system of claim 1 wherein said fuel rate is controlled by said fuel processor electronic control unit setting a power management module input voltage as a function of said permeate pressure in accordance with the following relationship:

$$V_{PMMIN}=K_{p2}*\text{Error}_{POC}+(1/T_{i2})\int\text{Error}_{POC}+T_{d2}*\Delta\text{Error}_{POC}, \text{ where:}$$

$V_{PMMIN}$ is said power management module input voltage; and
$\text{Error}_{POC}=P_C-P_{CSET}$, with:
$P_C$ being said permeate pressure,
$P_{CSET}$ is a permeate pressure set-point, and where:

$$\Delta\text{Error}_{POC}=\text{Error}_{POC}(t+\Delta t)-\text{Error}_{POC}(t); \text{ with}$$

with t being a point in time and t+Δt being a point in time offset from t by an increment of time;
$K_{p2}$ is a proportional gain;
$T_{i2}$ is an integral gain; and
$T_{d2}$ is a derivative gain.

3. The system of claim 2 wherein said permeate pressure set-point is an inverse function of said fuel processor temperature.

4. The system of claim 3 wherein fuel cell generates an output current that is a function of the power management module input voltage.

5. The system of claim 4 wherein said power management module is operative to divide said fuel cell output current between a load current supplied to said electrical load and a storage device current supplied to said energy storage device such that said fuel cell follows changes in said electrical load and further wherein the sum of said load current and said storage device current is a power management module output current.

6. The system of claim 5 wherein said fuel processor electronic control unit monitors said power management module output current and said energy storage supply current and further wherein said processor electronic control unit monitors said monitored values to generate a fuel flow rate control signal.

7. The system of claim 6 wherein said processor electronic control unit generates said fuel flow rate control signal with the following relationships:

$$S_A=K_{ff}*I_L=K_{ff}*(I_{PMM}-I_S);$$

where
$S_A$ is said fuel flow rate control signal,
$I_{PPM}$ is said power management module output current,
$I_S$ is said energy storage supply current, and
$K_{ff}$ is a feed forward gain that is determined from the following relationship:

$$K_{ff}=K_p*\text{Error}_{SOC}+(1/T_i)\int\text{Error}_{SOC}+T_d*\Delta\text{Error}_{SOC};$$

where:
$K_p$ is a proportional gain,
$T_i$ is an integral gain;
$T_d$ is derivative gain, and $$\text{Error}_{SOC}=V_{Desired}-V_{Battery};$$

with:
$V_S$ being said monitored energy storage device voltage,
$V_{Desired}$ being a voltage required to maintain the proper state of charge on the energy storage device with the actual value for $V_{Desired}$ being dependent upon the specific energy storage device being utilized, and $$\Delta\text{Error}_{SOC}=\text{Error}_{SOC}(t+\Delta t)-\text{Error}_{SOC}(t);$$

with t being a point in time and t+Δt being a point in time offset from t by an increment of time; and
$V_{Desired}$ is the voltage required to maintain the proper state of charge on the batteries, the value for $V_{Desired}$ is dependent upon the specific energy storage device being utilized.

8. The system according to claim 7 wherein said controllable fuel supply includes a fuel storage source connected through a variable speed pump to said fuel processor and further wherein said processor electronic control unit is operative to send said fuel flow rate control signal to said pump.

9. The system according to claim 8 wherein said fuel processor includes a reformer and a membrane separator with said reformer operative to transform said fuel into reformate with a combustion process and said membrane separator operative to separate said reformate into retentate and permeate with said retentate being returned to said reformer as a function of said permeate pressure.

10. The system according to claim 9 wherein said temperature within said fuel processor is measured for said reformer.

11. The system according to claim 10 wherein a variable supply of combustion air is provided to said reformer to support said combustion process and further wherein said fuel processor electronic control unit is operative to control said variable supply of combustion air as a function of said fuel flow rate and said reformer temperature.

12. The system according to claim 11 wherein said fuel is a hydrocarbon and said permeate is hydrogen separated from said fuel by said fuel processor.

13. A method of controlling an integrated fuel processor and fuel cell system comprising the steps of:
   (a) providing a variable supply of permeate from the fuel processor to the fuel cell as fuel for the fuel cell;
   (b) adjusting the permeate pressure at the fuel cell as a function of the output current of the fuel cell; and
   (c) controlling the permeate pressure at the fuel cell as a function of a temperature of a portion of the fuel processor.

14. The method of claim 13 wherein the fuel processor includes a reformer and a membrane separator with the reformer operative to transform the fuel into reformate with a combustion process and the membrane separator operative to separate the reformate into retentate and permeate with the retentate being returned to said reformer and the permeate being supplied to the fuel cell.

15. The method of claim 14 further including the steps of supplying fuel to the reformer with the quantity of fuel input to the reformer controlled in response to a reformer temperature.

16. The method of claim 15 further including a step of controlling the combustion air input to the fuel reformer in response to a fuel flow rate and the reformer temperature.

17. The method of claim 16 wherein the retentate returned to the reformer is a function of the permeate pressure.

18. The method of claim 17 wherein the fuel flow rate is function of the difference between the permeate pressure and a permeate pressure set-point with the permeate pressure set-point being a function of the reformer temperature.

* * * * *